United States Patent [19]

Pratt

[11] 4,221,265

[45] Sep. 9, 1980

[54] ROCK PICKER

[76] Inventor: Leslie J. Pratt, Box 197, Aberdeen, Id. 83210

[21] Appl. No.: 858,970

[22] Filed: Dec. 9, 1977

[51] Int. Cl.² .......................................... A01D 17/00
[52] U.S. Cl. .................................... 171/126; 171/63; 56/327 R
[58] Field of Search ..................... 56/1, DIG. 1, 14.5, 56/14.6, 13.5, 327 R; 171/63, 126, 101

[56] References Cited

U.S. PATENT DOCUMENTS

| 47,566 | 5/1865 | Quimby | 171/63 |
|---|---|---|---|
| 934,934 | 9/1909 | Rice | 171/126 |
| 2,771,078 | 11/1956 | Summers | 56/DIG. 1 |
| 2,827,241 | 3/1958 | Downs | 171/116 X |
| 2,835,098 | 5/1958 | Scheidenhlem | 56/327 R |
| 2,976,936 | 3/1961 | Fry | 171/126 |
| 3,179,263 | 8/1962 | Walter | 214/5.5 |
| 3,454,100 | 7/1969 | Lilley | 171/116 |
| 3,540,534 | 11/1970 | Rhoads | 171/63 |
| 3,863,431 | 2/1975 | Fowler | 56/13.5 |

*Primary Examiner*—Russell R. Kinsey
*Attorney, Agent, or Firm*—Mallinckrodt & Mallinckrodt

[57] ABSTRACT

A rock picker in the form of a wheeled vehicle for travel over a field that has rocks scattered superficially and/or near superficially therein, comprises a wheeled chassis that supports two coacting, endless chain conveyors of draper chain type having their working runs in confronting relationship and widths extending transversely of the chassis. One of the conveyors is elongate and disposed below the other, which is relatively short. The short upper conveyor has its working run of widespread, substantially V configuration, with the vertex of the V extending transversely of the lower conveyor at or near its lower end, which is disposed at or near ground level, thus forming entry and exit bights therewith. The forward, entry bight receives rocks lifted thereinto by a scraper blade, which is mounted on the frame immediately in advance of the conveyors as a ramp leading substantially smoothly into the throat between the two conveyors. The short upper conveyor is mounted freely for up and down movement as rocks are received by the entry bight and are conveyed through the throat and upwardly by means of the lower conveyor, which slopes upwardly from front to rear of the chassis. Means are preferably provided intermediate the length of the lower conveyor for preventing rollback of rocks being conveyed upwardly, and a receiving dump vessel is preferably provided for catching and collecting rocks discharged from the upper end of the lower conveyor. Screening means, e.g. a series of powered screening rollers, is preferably interposed between the scraper blade and the lower conveyor within the entry bight as an extension of the ramp for screening out earth and pebbles accompanying the rocks.

17 Claims, 6 Drawing Figures

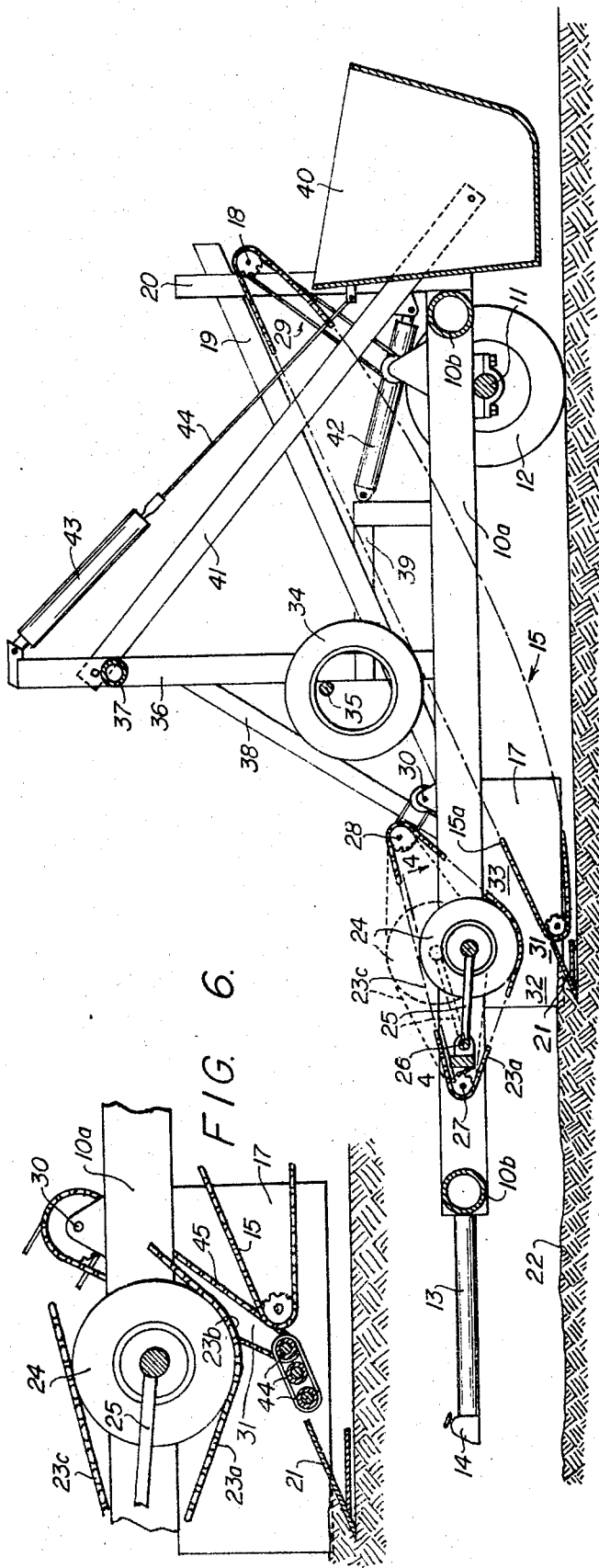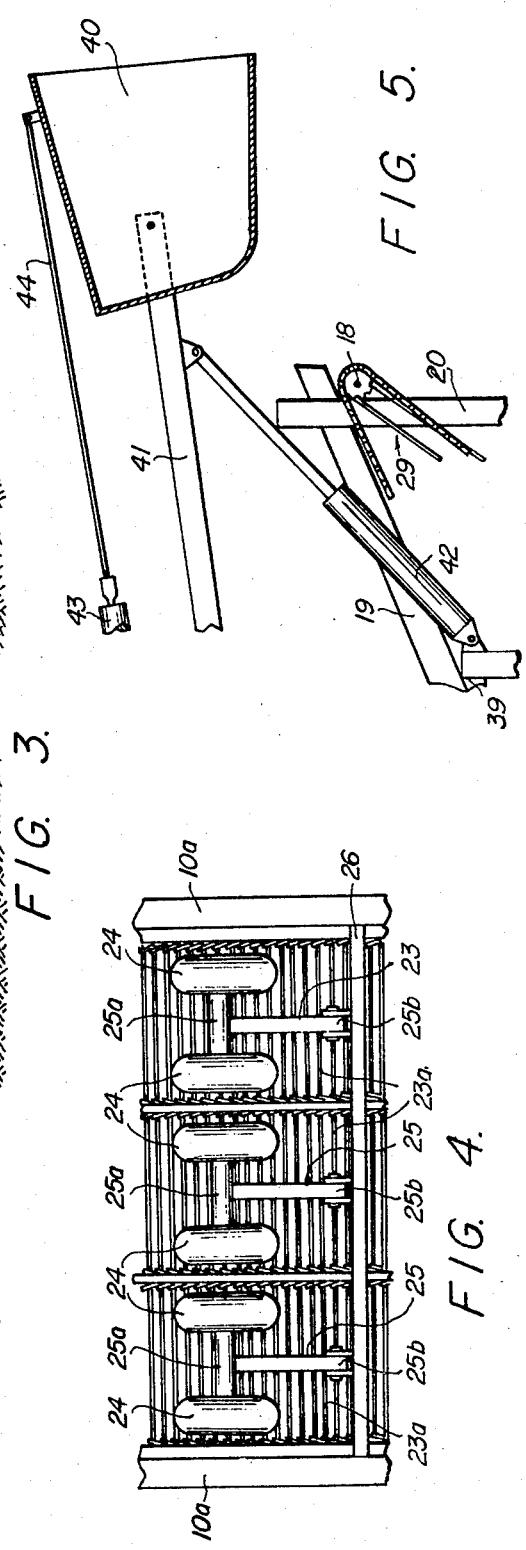

ROCK PICKER

BACKGROUND OF THE INVENTION

1. Field

The invention is in the field of vehicles constructed to pick up rocks scattered over ground to be cleared of rocks, so such ground can be used for agricultural purposes or otherwise.

2. State of the Art

A rock picker having some resemblance to the apparatus of the present invention has been disclosed heretofore in U.S. Pat. No. 3,261,408 issued to L. J. Simonar et al. on July 19, 1966, and entitled "Stone Picker". However, there are significant structural and functional differences. Thus, in that machine, any digging that may be appropriate to unearth rocks that are near the surface is effected by outrigger digging and conveying cylinders having digging teeth arranged helically to move rocks centrally of the machine into the path of a toothed, rotating drum, which picks up the rocks and feeds them into a throat of fixed dimension between lower and upper grids, through which chain conveyors operate to engage and propel the rocks upwardly onto the lower grid to discharge onto a second grid leading to a towed, receiving trailer.

SUMMARY OF THE INVENTION

A principal purpose in the making of the present invention was to provide a relatively simple and inexpensive machine that would accommodate and effectively handle rocks differing considerably in size and physical shape.

In accordance with the invention, rocks lying on the surface of the ground are pushed, and rocks lying within the ground but exposed at or lying near the surface thereof are dislodged and pushed, into coacting, lower and upper, endless conveyors of draper chain type, by a scraper blade extending across the line of action of such endless chain conveyors. The conveyors extend across the entire width of the vehicle chassis, and the scraper blade extends across substantially the entire width of the conveyors. Moreover, a widespread V formation of the working lower run of the upper conveyor is so related positionally to the lower end portion of the lower conveyor and to the scraper blade disposed in advance thereof as to provide an entry bight leading into the throat between the two conveyors. Additionally, the upper conveyor is mounted for up and down movement so as to accommodate different sizes and shapes of rocks, and the scraper blade provides a ramp leading through the entry bight into the throat, whereby the rocks encountered by the blade are effectively raised and passed smoothly and positively rearwardly through the throat and an exit bight and onto the upwardly sloping run of the lower conveyor. The ramp is advantageously of reclining V configuration in cross-section with a forwardly directed vertex and an extended blade member as a digging blade edge for the scraper and with a substantially horizontal base member to prevent loosened rocks from riding up the underside of the ramp.

There is preferably provided screening means between the scraper blade and the lower conveyor within the entry bight as an extension of the ramp for screening out earth and pebbles accompanying the rocks. Advantageously, such screening means comprises a series of powered rollers substantially commensurate in width with the scraper blade and endless conveyors and suitably spaced apart for screening purposes, the direction of rotation of which rollers being such as will aid in advancing the rocks up the ramp and onto the lower conveyor.

THE DRAWINGS

Embodiments of rock pickers representing the best mode presently contemplated of carrying out the invention in actual practice is illustrated in the accompanying drawings, in which:

FIG. 1 is a pictorial view of a rock picker in accordance with the invention constructed as a trailer for attachment to a tractor having the usual hydraulic mechanism for raising and lowering the hitch;

FIG. 2, a view in front elevation;

FIG. 3, a longitudinal vertical section taken along the line 3—3 of FIG. 2;

FIG. 4, a fragmentary horizontal section taken along the line 4—4 of FIG. 3 and drawn to a somewhat larger scale;

FIG. 5, a fragmentary view corresponding to the rearward part of FIG. 3 indicating how the receiving vessel is dumped; and FIG. 6, a fragmentary view corresponding to the ramp and conveyor throat portions of FIG. 3 but drawn to a larger scale and showing a more preferred embodiment provided with advance screening means.

DETAILED DESCRIPTION OF THE ILLUSTRATED EMBODIMENTS

Figure 1:
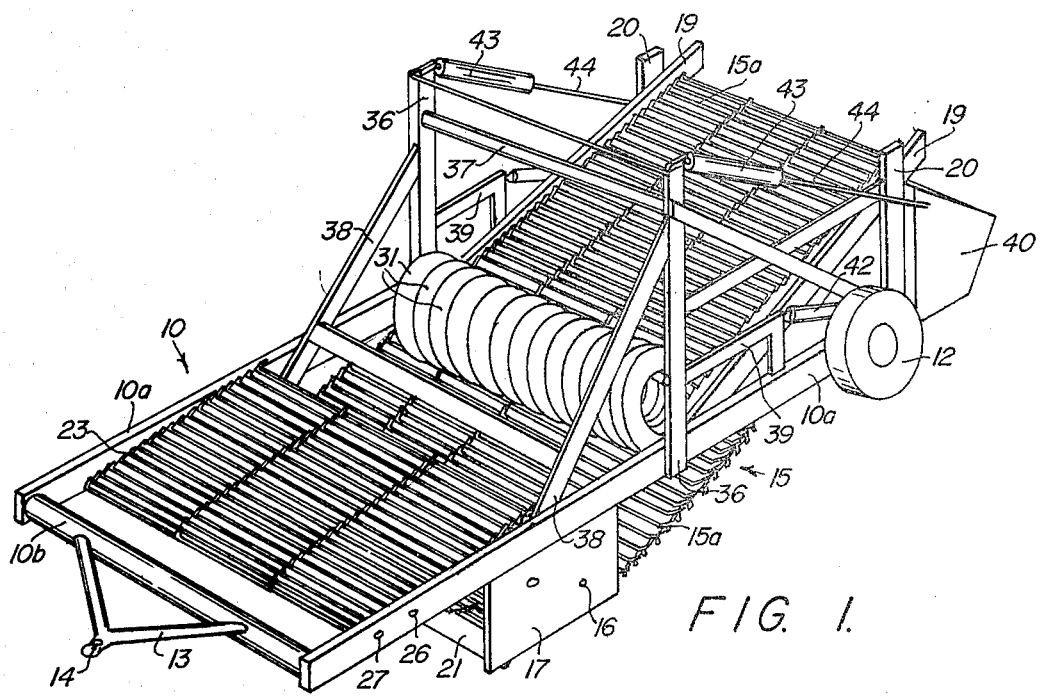

As shown, it is preferred to construct the rock picker of the invention as a trailer vehicle for hitching to a standard farm tractor for use as and when desired. In its illustrated form, the rock picker comprises an elongate, wheeled chassis 10, having an elongate frame made up of longitudinal structural members 10a and transverse structural members 10b. An axle 11 at the rearward end of the frame carries wheels 12 for enabling the machine to travel back and forth across a field to be cleared of rocks. A tongue 13, projecting forwardly from the forward end of the chassis, carries a tractor hitch 14.

A lower, elongate, endless conveyor 15 of draper chain type is mounted within the chassis frame, with its lower end carried adjacent to ground surface by a sprocketed shaft 16 journaled at its ends in respective plates 17 which are secured to and depend from frame members 10a, respectively. Such conveyor 15 extends upwardly and rearwardly of chassis 10 and has its rearward end carried by a sprocketed shaft 18, FIG. 3, which is journaled in and between sideboards 19, respectively, that form part of a superstructure including standards 20, respectively, fixed to respective members 10a of chassis 10.

Rigidly carried by and between plates 17 immediately in advance of the lower end of conveyor 15 is a scraper blade 21. Depending upon the setting of the machine with respect to ground surface during operation of the tractor towing the machine through a field, blade 21 is positioned to either scrape along the surface of the ground 22, for engaging and lifting any rocks resting on such surface, or to dig below the surface and upset and level the ground, see FIG. 3, as well as to engage and lift rocks that may be partially exposed or shallowly positioned near ground surface. It should be noted that scraper blade 21 is positioned relative to the lower end of conveyor 15 as a ramp leading smoothly onto the upper working run 15a of such conveyor. It should also be noted that the ramp is advantageously of reclining V configuration in cross-section, with a forwardly directed vertex and an extended blade member 21a, FIGS. 3 and 6, serving as a digging blade edge for the scraper and with a substantially horizontal base member 21b that is pressed downwardly as the blade digs into the soil, as illustrated, and prevents loosened rocks from riding up the underside of upwardly sloping ramp member 21c to clog or damage the mechanism of conveyor 15.

Positioned above elongate, lower conveyor 15 is a relatively short, upper, endless conveyor 23, also of draper chain type and having its lower, working run 23a normally of widespread V formation whose vertex 23b extends transversely of conveyor 15 substantially at and above the lower end thereof. The lower and upper conveyors 15 and 23, respectively, are of substantially equal width, which substantially corresponds with the width of chassis 10. Scraper blade 21 is also of substantially the same width.

Figure 2:
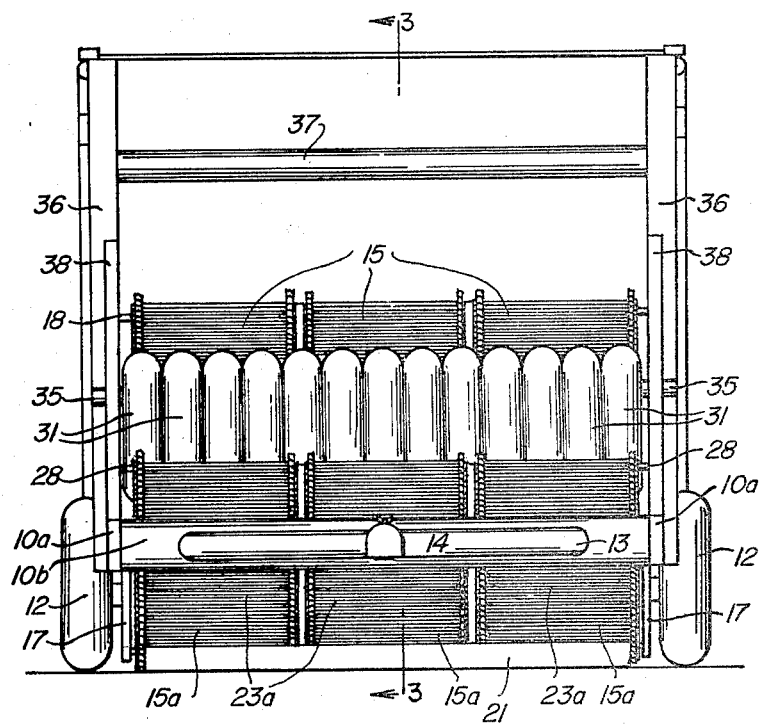

In the present embodiment, both the lower and upper conveyors are made up of side-by-side sections individually sprocketed, as indicated in FIGS. 1 and 2. The scraper blade preferably extends unitarily across the complete widths of these conveyors.

The V formation of the lower, working run 23a of upper conveyor 23 is preferably provided by pairs of elastomer-tired wheels 24 corresponding to the respective sections of the conveyor, each pair being rotatably mounted on the free floating end 25a, FIG. 4, of a T-frame 25, whose other end 25b is journaled in and between frame members 10a on a crossbeam 26. Thus, the individual pairs of wheels 24 are free to rise and fall, i.e. move upwardly and downwardly, relative to one another under pressure from below exerted on the respective V vertices and lower working runs of the respective sections of upper conveyor 23, thereby not only fully accommodating rocks of different sizes but keeping the conveyor chain taut at all times.

The relatively short, upper conveyor 23 is preferably of triangular configuration, with the sides which define the V being of equal length. Such triangular configuration is established by sprocketed shafts 27 and 28 at the vertices other than 23b. It is preferred that the upper run 23c of each conveyor section be in contact with the treads of its pair of tired wheels 24, so the conveyor chain is kept taut during rise and fall thereof and of the wheels 24.

Means, in the form of a motor and pulley drive assembly 29, are provided for powering lower conveyor 15, and means, also in the form of a motor and drive assembly, 30, are provided for powering upper conveyor 23. The lower conveyor runs clockwise, while the upper conveyor runs counter-clockwise at preferably the same speed, the working run of each traveling rearwardly.

It will be noted that these co-acting conveyors 15 and 23 define a throat 31, FIG. 3, therebetween and a convergent entry bight 32 thereto and a divergent exit bight 33 therefrom, through which entry bight, throat, and exit bight rocks picked up by scraper 21 pass, and that rocks of different sizes and shapes are accommodated by the up and down movement of wheels 24 and the lower run of conveyor 23. The rocks are lifted by scraper 21 and pass smoothly through entry bight 32 into throat 31 and continue through exit bight 33 and onwardly and upwardly on upper run 15a of conveyor 15, to the rear of chassis 10.

To check roll-back of rocks carried by the upper portion of conveyor 15, it is advantageous to provide a transverse series of free-hanging, unmounted, pneumatic tires 34 on a stationary shaft 35 intermediate the length of conveyor 15 and riding freely on upper run 15a thereof. Such tires are lifted by the rocks passing thereunder and drop back into place immediately thereafter. Shaft 35 is fastened to and across standards 36, respectively, forming part of a superstructure comprising cross-piece 37 and respective braces 38. For strength and stability, standards 20 and standards 36 are secured together by respective braces 39.

The conveyed rocks are discharged at the upper end of conveyor 15 and are preferably caught and collected by a receiving vessel 40. Such vessel is advantageously arranged for dumping by hydraulically-actuated, mechanical means under the control of the operator of the machine. Thus, such receiving vessel 40 is pivotally connected at its opposite sides to respective arms 41, which are, in turn, pivotally connected to standards 36, respectively, and lifted and lowered by hydraulic power cylinders 42, respectively. Upon being lifted to an appropriate height for dumping purposes, meanwhile having been pushed rearwardly to clear the upper sprocketed end 18 of conveyor 15, dumping is effected by hydraulic power cylinders 43, respectively, which apply pushing force to the upper rear of vessel 40 through push rods 44, see FIG. 5.

It has been found highly desirable, though not indispensable in most instances, to provide for advance screening of the material picked up by the scraper blade, since often there is considerable loose earth, pebbles, etc. picked up and sent rearwardly onto the lower conveyor with the rocks. Although such lower conveyor as comprised of draper chain has an inherent screening function, even so it has been found advantageous to effect advance screening. For this purpose, it is preferred to provide a series of powered rollers 44, FIG. 6, between scraper 21 and the lower end of lower conveyor 15 as an extension of the ramp provided by the scraper. Rollers 44 extend transversely of the conveyors in parallel with the blade and are suitably spaced apart for screening purposes. Three rollers, each four inches in diameter and spaced from the adjacent roller or rollers by one inch, have proven very satisfactory, but these dimensions are not critical.

The rollers may be conveniently powered by motor 30, which has a drive 45 connected to a unidirectional drive arrangement, such as respective sprockets and a sprocket chain in common, for rotating each roller clockwise to aid in moving the material rearwardly along the ramp.

Whereas this invention is here illustrated and described in detail with respect to embodiments thereof constituting the best mode presently contemplated of carrying out the invention, it should be understood that various changes may be made within the broader teachings hereof without departing from the claims that follow.

I claim:

1. A vehicle for removing superficial and near superficial rocks scattered about a field, comprising a wheeled chassis which includes an elongate frame of structural members; a lower, elongate, endless conveyor of draper chain type having width extending transversely of said frame and one end disposed adjacent to ground level at the forward end of said chassis, said conveyor sloping upwardly toward the rearward end of the chassis; a scraper blade substantially commensurate in width with and secured in advance of but adjacent to such lower end of said conveyor and merging substantially smoothly thereinto as a ramp for lifting rocks onto said lower end of the conveyor as the vehicle travels over a field; an upper, relatively short, endless conveyor of draper chain type having width substantially commensurate with that of the lower conveyor and a widespread, substantially V configuration on its underside and being mounted in said frame above said blade and said lower end of the lower conveyor for up and down movement relative to said blade and lower conveyor so there is a throat with entry and discharge bights between the two conveyors that will accept and accommodate rocks of different sizes and shapes; wheels mounted for up and down movement with the upper conveyor and positioned to maintain the vertex of said upper conveyor of rounded formation; means for driving the lower conveyor so that its upper run travels rearwardly; and means for driving the upper conveyor so that its lower run travels rearwardly.

2. A vehicle in accordance with claim 1, wherein the upper run of the upper conveyor is in friction contact with the surfaces of the wheels.

3. A vehicle in accordance with claim 2, wherein the upper conveyor is of substantially triangular formation, with sides of substantially equal length defining the V formation, and wherein there are sprockets at the vertices opposite the V vertex to normally maintain the triangular formation, the means for driving said upper conveyor being connected to one of said sprockets.

4. A vehicle in accordance with claim 1, wherein means for preventing roll-back of rocks on the elongate conveyor is provided between the relatively short conveyor and the rearward end of said elongate conveyor.

5. A vehicle in accordance with claim 4, wherein the means for preventing roll-back comprises a series of unmounted pneumatic tires hanging freely on a common axis that extends transversely of the elongate conveyor and having their treads resting on the working surface of said elongate conveyor.

6. A vehicle in accordance with claim 1, wherein a receiving vessel is mounted on the chassis frame below the rearward end of the elongate conveyor for catching and collecting rocks discharged by said conveyor.

7. A vehicle in accordance with claim 6, wherein means are provided for dumping the receiving vessel.

8. A vehicle in accordance with claim 1, wherein the scraper blade is adapted to shallowly penetrate and upset the earth surface of the field to expose and lift near surface rocks.

9. A vehicle in accordance with claim 1, wherein there are a side-by-side series of lower conveyors and a similar series of upper conveyors, the latter being mounted for individual up and down movement relative to one another.

10. A vehicle in accordance with claim 1, wherein screening means are interposed between the blade and the lower end of the lower conveyor as an extension of the ramp.

11. A vehicle in accordance with claim 10, wherein the screening means comprises a series of spaced, rotatable rollers extending in parallel and substantially commensurate in length with the blade; and power means for rotating said rollers in a rearward direction to aid in lifting rocks onto the elongate conveyor.

12. A vehicle in accordance with claim 1, wherein the scraper blade is of substantially reclined V formation in cross-section, with its vertex directed forwardly as a digging blade edge and with a substantially horizontal base member serving to prevent loosened rocks from riding up the underside of the ramp.

13. A vehicle in accordance with claim 15, wherein the scraper blade is extended forwardly beyond the vertex to facilitate digging.

14. A vehicle in accordance with claim 1, wherein the wheels positioned to maintain the vertex of the upper conveyor of rounded formation are elastomer tired.

15. A vehicle for removing superficial and near superficial rocks scattered about a field, comprising a wheeled chassis which includes an elongate frame of structural members; a lower, endless conveyor having width extending transversely of said frame and one end disposed adjacent to ground level at the forward end of said chassis, said conveyor sloping upwardly toward the rearward end of the chassis; a scraper blade substantially commensurate in width with and secured in advance of but adjacent to such lower end of said conveyor and merging substantially smoothly thereinto as a ramp for lifting rocks onto said lower end of the conveyor as the vehicle travels over a field; an upper, relatively short, endless conveyor having width substantially commensurate with that of the lower conveyor and a widespread, substantially V configuration on its underside and being mounted in said frame above said blade and said lower end of the lower conveyor for up and down movement relative to said blade and lower conveyor and with the vertex of the V extending along the width of the lower conveyor so there is a throat with entry and discharge bights between the two conveyors that will accept and accommodate rocks of different sizes and shapes, the mounting of the upper endless conveyor for up and down movement comprising a frame pivotally secured at one end to the chassis and free to rise and fall at its opposite end, and wheels rotatably carried by the free end of the frame and resting on the lower run of said upper conveyor intermediate its length and contacting the upper run of said upper conveyor intermediate its length; means for driving the lower conveyor so that its upper run travels rearwardly; and means for driving the upper conveyor so that its lower run travels rearwardly.

16. A vehicle for clearing a field of rocks and preparing it for agricultural purposes, comprising a wheeled chassis which includes an elongate frame of structural members; a lower, elongate, endless conveyor having width extending transversely of said frame and one end disposed adjacent to ground level at the forward end of said chassis, said conveyor sloping upwardly toward the rearward end of the chassis; a scraper blade substantially commensurate in width with and secured in advance of but adjacent to such lower end of said conveyor and merging substantially smoothly thereinto as a ramp for lifting rocks onto said lower end of the conveyor as the vehicle travels over a field, said scraper blade being of substantially reclined V formation in transverse section, with its vertex directed forwardly as a digging blade edge and with a substantially horizontal base member serving to prevent loosened rocks from riding up the underside of the ramp; an upper, relatively short, endless conveyor having width substantially commensurate with that of the lower conveyor and a widespread, substantially V configuration on its underside and being mounted in said frame above said blade and said lower end of the lower conveyor for up and down movement relative to said blade and lower conveyor and with the vertex of the V extending along the width of the lower conveyor so there is a throat with entry and discharge bights between the two conveyors that will accept and accommodate rocks of different sizes and shapes; means for driving the lower conveyor sothat its upper run travels rearwardly; and means for driving the upper conveyor so that its lower run travels rearwardly.

17. A vehicle in accordance with claim 16, wherein the scraper blade is extended forwardly beyond the vertex to facilitate digging.

* * * * *